US010991269B2

(12) United States Patent
Russomanno et al.

(10) Patent No.: US 10,991,269 B2
(45) Date of Patent: Apr. 27, 2021

(54) MICROFLUIDIC ACTUATORS WITH INTEGRATED ADDRESSING

(71) Applicant: THE REGENTS OF THE UNIVERSITY OF MICHIGAN, Ann Arbor, MI (US)

(72) Inventors: Alexander C. Russomanno, Ann Arbor, MI (US); Richard Brent Gillespie, Ann Arbor, MI (US); Maire Sile O'Modhrain, Ann Arbor, MI (US); Mark A. Burns, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 344 days.

(21) Appl. No.: 15/737,195

(22) PCT Filed: Jun. 15, 2016

(86) PCT No.: PCT/US2016/037638
§ 371 (c)(1),
(2) Date: Dec. 15, 2017

(87) PCT Pub. No.: WO2016/205375
PCT Pub. Date: Dec. 22, 2016

(65) Prior Publication Data
US 2018/0158367 A1 Jun. 7, 2018

Related U.S. Application Data

(60) Provisional application No. 62/181,244, filed on Jun. 18, 2015.

(51) Int. Cl.
*G09B 21/00* (2006.01)
*F15B 15/10* (2006.01)
(Continued)

(52) U.S. Cl.
CPC ............ *G09B 21/004* (2013.01); *F15B 15/10* (2013.01); *F15D 1/007* (2013.01); *G06F 3/016* (2013.01);
(Continued)

(58) Field of Classification Search
CPC ..... G09B 21/004; G09B 21/003; G06F 3/016; F15D 15/10; F15D 1/007; F15D 15/1404;
(Continued)

(56) References Cited

U.S. PATENT DOCUMENTS 5,496,174 A 3/1996 Garner
6,521,188 B1 2/2003 Webster
(Continued)

FOREIGN PATENT DOCUMENTS

EP 2517089 A1 10/2012
WO WO-2004077379 A2 9/2004

OTHER PUBLICATIONS

International Search Report and Written Opinion of the International Searching Authority issued in PCT/US2016/037638, dated Sep. 28, 2016, ISA/KR.
(Continued)

*Primary Examiner* — Thomas C Lee
*Assistant Examiner* — Anzuman Sharmin
(74) *Attorney, Agent, or Firm* — Harness, Dickey & Pierce, P.L.C.

(57) ABSTRACT

A fluidic logic and actuator system for outputting a displacement having a fluidic logic circuitry layer including a fluidic control input and a plurality of fluidic latching memory units. At least some of the plurality of fluidic latching memory units are configured to perform combinatorial and sequential logic functions and output a fluid response. A fluid actuator layer is provided having a plurality of fluid actuators, wherein each of the plurality of fluid actuators
(Continued)

being movable in response to the fluid response of a corresponding one of the plurality of fluidic latching memory units.

16 Claims, 11 Drawing Sheets

(51) Int. Cl.
 *G06F 3/01* (2006.01)
 *F15D 1/00* (2006.01)
 *F15B 15/14* (2006.01)

(52) U.S. Cl.
 CPC ........ *G09B 21/003* (2013.01); *F15B 15/1404* (2013.01); *F15B 2211/305* (2013.01); *F15B 2211/71* (2013.01); *F15B 2211/78* (2013.01)

(58) Field of Classification Search
 CPC ............. F15D 2211/71; F15D 2211/78; F15D 2211/305
 See application file for complete search history.

(56) References Cited

U.S. PATENT DOCUMENTS

| | | | |
|---|---|---|---|
| 7,766,033 B2 | 8/2010 | Mathies et al. | |
| 8,154,527 B2 | 4/2012 | Ciesla et al. | |
| 8,199,124 B2 | 6/2012 | Ciesla et al. | |
| 8,207,950 B2 | 6/2012 | Ciesla et al. | |
| 8,243,038 B2 | 8/2012 | Ciesla et al. | |
| 8,456,438 B2 | 6/2013 | Ciesla et al. | |
| 2009/0174673 A1 | 7/2009 | Ciesla | |
| 2010/0103137 A1 | 4/2010 | Ciesla et al. | |
| 2010/0171719 A1 | 7/2010 | Craig et al. | |
| 2010/0233799 A1 | 9/2010 | Takayama et al. | |
| 2011/0148793 A1 | 6/2011 | Ciesla et al. | |
| 2011/0254709 A1 | 10/2011 | Ciesla et al. | |
| 2011/0254789 A1 | 10/2011 | Ciesla et al. | |
| 2012/0062483 A1 | 3/2012 | Ciesla et al. | |
| 2012/0098789 A1 | 4/2012 | Ciesla et al. | |
| 2012/0193211 A1 | 8/2012 | Ciesla et al. | |
| 2013/0209328 A1 | 8/2013 | Dresse et al. | |
| 2013/0255799 A1* | 10/2013 | Devaraju | B01L 3/502707 137/488 |
| 2015/0029126 A1* | 1/2015 | Ciesla | G06F 3/0202 345/173 |
| 2016/0202761 A1* | 7/2016 | Bostick | G09B 21/006 345/174 |
| 2016/0240102 A1* | 8/2016 | Barr | G09B 21/007 |

OTHER PUBLICATIONS

Bansevicius, R. et al., "Two-Dimensional Braille Readers Based on Electrorheological Fluid Valves Controlled by Electric Field," Mechatronics, vol. 17, No. 10 (2007), pp. 570-577.

Rhee, Minsoung, "Advanced Components of Microfluidic Systems for Bioanalytical Applications," University of Michigan Thesis, Doctor of Philosophy (Chemical Engineering) 2009.

Greenemeier, Larry, "Braille Displays Promise to Deliver the Web to the Blind," Scientific American, Apr. 5, 2010.

Melin, Jessica, et al., "Microfluidic Large-Scale Integration: The Evolution of Design Rules for Biological Automation," Annual Review of Biophysics and Biomolecular Structure, vol. 36 (2007), pp. 213-231.

Grover, William H., et al., "Development and Multiplexed Control of Latching Pneumatic Valves Using Microfluidic Logical Structures," The Royal Society of Chemistry, Lab Chip, vol. 6 (2006) pp. 623-631.

Chang, Meng-Ping, "Electrostatic Elastomer Devices for Reconfigurable High-Density Microfluidics," University of Michigan Dissertation in Mechanical Engineering (2008).

* cited by examiner

MICROFLUIDIC ACTUATORS WITH INTEGRATED ADDRESSING

CROSS REFERENCE TO RELATED APPLICATIONS

This application is a U.S. National Phase Application under 35 U.S.C. 371 of International Application No. PCT/US2016/037638 filed on Jun. 15, 2016 and published as WO 2016/205375 A1 on Dec. 22, 2016. This application claims the benefit of U.S. Provisional Application No. 62/181,244, filed on Jun. 18, 2015. The entire disclosures of the above applications are incorporated herein by reference.

FIELD

The present disclosure relates to microfluidic actuators and, more particularly, to an array of microfluidic actuators having integrated addressing.

BACKGROUND AND SUMMARY

This section provides background information related to the present disclosure which is not necessarily prior art. This section provides a general summary of the disclosure, and is not a comprehensive disclosure of its full scope or all of its features.

There is a need for a low-cost, full-page surface haptics device suitable for displaying braille characters and tactile diagrams under computer control. Current commercial refreshable braille display devices are expensive and bulky, mainly due to the piezoelectric bimorph technology used within them. In their current form, they are able to render a single line of content at a time and it is difficult to upgrade the technology to achieve a full-page of content, while keeping the cost low.

According to the principles of the present teachings, an array having a plurality of raised features on a flat surface is provided to be sensed by the human fingertip. The tactile features are fully programmable so that they can be individually addressed and controlled to raise and lower. As such, they might be called "taxels" in analogy with "pixels" on an LCD.

In some embodiments of the current teachings, standard microfluidic fabrication techniques are used to create individually addressable membrane actuators. The actuators can be formed in a compliant microfluidic substrate with an array of chambers beneath a thin elastic membrane. Pressurized fluid is routed via micro-scale channels (e.g. microfluidics) to the chambers to create localized deflections of the elastic membrane on the surface. In some embodiments, the actuators may either serve directly as tactile features or be used to drive other features within an interface layer. Therefore, the present teachings should not be regarded as being limited to outputting a tactile result, but may find utility in a wide variety of applications.

In some embodiments, for the fluid actuators, the pressure source is spatially separated from the actuator and the conversion from pressure to actuator displacement is very compactly performed with a membrane. Unlike electromechanical actuators, e.g. piezoelectric and electrostatic, that require a larger amount of space to do the conversion from electrical power to mechanical state (displacement), membrane actuators can be tightly packed together and made having a very low profile, thereby permitting the tactile device can be made thin.

The fluidic actuator technology described herein is one of many technologies under development in the field of surface haptics. Fluidic actuators can be categorized as a form of shape display, wherein physical features are raised on a surface. Other technologies are being developed that create virtual features on a surface by modulating friction forces. As a user moves their finger across a surface, textures and bumps can be realized by modulating the frictional force between the surface and user's finger, where the frictional force is uniformly distributed across the contact patch between the surface and user's finger. As these technologies are unable to modulate the distribution of forces within the contact patch, they are not suitable for rendering braille.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, a monolithic material or composition of materials structured with channels and chambers to be filled with fluid (gas or liquid) is provided. The pressure of such fluid can either be elevated or depressed relative to atmospheric pressure under the control of external means, such as, but not limited to, electronic valves, pumps, pressure and/or vacuum vessels, and the like. In some embodiments, control of pressure may be rapid and associated with small amounts of flow on certain channels (carrying information), while, conversely, pressure variation may be small on other channels and associated with significant amounts of flow (carrying power).

As will be described herein, the channels and chambers are variously connected and occasionally separated by walls or membranes that are compliant and therefore responsive to difference in pressure across their surfaces by virtue of their geometry (possibly thickness) or material composition. Although the present teachings will be discussed in connection with preferred embodiments, it should be understood that the present teachings should not be limited to the specifically recited embodiments. Variations of construction, materials, and arrangement are anticipated and remain within the scope of the present disclosure.

In some embodiments, the monolithic material or composition of materials with its variously arranged compliant walls or membranes is structured so as to realize two functions: 1) logic functions, and 2) actuator functions. When certain compliant walls deform under fluid pressure, logic and addressing functions are realized—akin to logic functions performed in solid-state electronics. In particular, certain flow or pressure in certain chambers or channels can be controlled by pressures (or flows) in other chambers or channels. When certain compliant walls deform under fluid pressure, actuator functions are realized. In particular, walls or membranes will displace under pressure within certain chambers and these displacements will be transmitted to an external surface of the device that can be touched by a user's finger or generate other useful output.

Although the term pressure may be used herein to describe the manner in which a signal is encoded as positive excursions from a baseline pressure, the signal should not be limited to positive excursions. That is, negative excursions relative to a baseline pressure, i.e. vacuum, can also be used to encode the signal. Also, variation in flow can be used to encode a signal. Moreover, it should be understood that the term "fluid" shall include either air or liquid. That is, the devices described herein may be construed as either pneumatic or hydraulic.

Limiting External Control Features

The space required for individually dedicated channels and corresponding external control valves for fluidic membrane actuators limits the potential array density. Connecting each actuator with a separate valve also presents a significant manufacturing challenge for a full-page sized tactile display that consists of about 10,000 tactile features. In order to make a large array of tactile features using fluidic actuators, there is a need for a method of addressing individual actuators without requiring dedicated channels and electronic control valves outside of the substrate. Instead, the control valves are realized in microfluidics and integrated into the substrate. It is thus feasible to build a portable tactile display device with densely-packed features suitable for braille without requiring a dedicated off-substrate, i.e. off-chip, control valve for each element—such a device would be too bulky and expensive to manufacture.

According to the principles of the present teachings, as illustrated in the figures, an apparatus and method of addressing and controlling fluid-based actuators for use in a full-page tactile display with only a few external control valves is provided. To realize this device in some embodiments, two layers, each one having a different function, are combined in a highly manufacturable process using microfluidic techniques to form a monolithic structure with integrated actuators and addressing. In certain embodiments, one layer (a fluidic actuator layer) is an array of chambers in which each individual chamber can be selectively pressurized to produce localized displacements of a membrane on one surface of that layer. The other layer (a fluidic logic circuitry layer) incorporates pressure-controlled valves or fluid transistors that are configured with similar valves into fluid circuits analogous to transistor circuits in electronic devices. The fluid circuits can perform similar functions including combinatorial and sequential logic functions so that memory states, such as in the form of pressure-based signals, can be transmitted and stored within the structure. As will be discussed herein, these logic functions enable individual actuators to be addressed without dedicating a pressure-carrying channel to each actuator. For example, a fluid latching register would allow a row of actuators to be addressed using a 'bus' of a small number of channels. Thus a few channels can serve a large number of actuators, providing both control and drive power.

An optional third layer, called an interface layer, can be combined with the fluidic logic circuitry and actuator layers to transmit the displacements of the fluid actuators embedded in the actuator layer to displacements of an outer surface that can be touched and explored by a human user's fingertips. The interface layer serves to both provide a more comfortable interaction surface and to protect the potentially more fragile compliant actuator layer from the human finger.

Figure 1A:
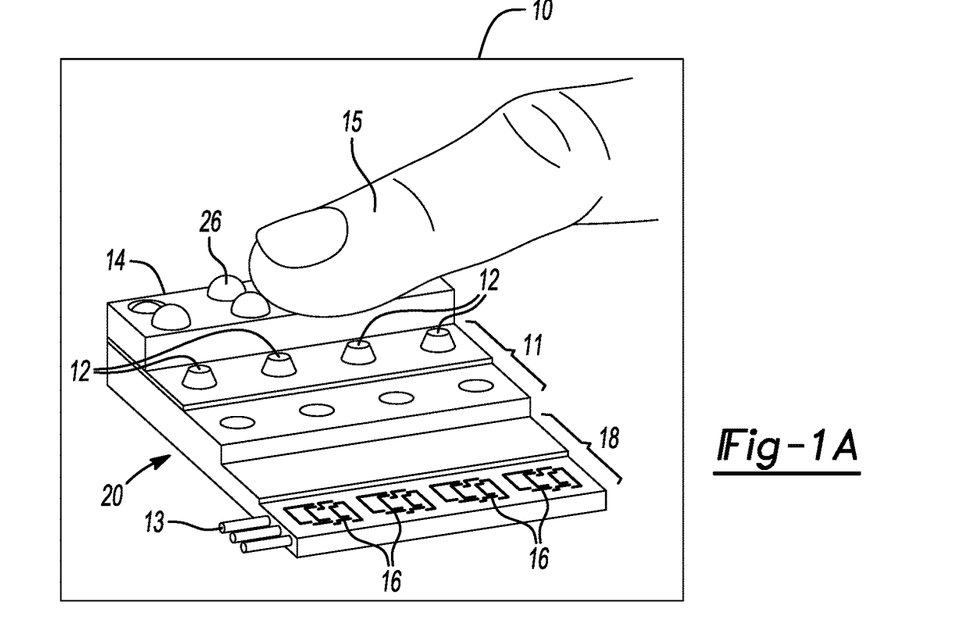
FIG. 1A illustrates an integrated fluidic logic and actuator system for surface haptics according to the principles of the present teachings.

The incorporation of fluid logic circuits with fluid actuators into the same structure greatly reduces the number of off-chip controllers, pipes, and valves needed to support a large-array tactile display. With particular reference to FIG. 1A, a multilayer fluidic logic and actuator system 10 is illustrated according to the present teachings comprising a fluidic logic circuitry layer 18, a fluid actuator layer 11, and an optional interface layer 14. In the embodiment depicted in FIG. 1A, the fluidic logic circuitry layer 18 and fluid actuator layer 11 are combined within a single substrate 20. Substrate 20 is in turn coupled to interface layer 14 such that fluid actuators 12 within the fluid actuator layer 11 can drive tactile features 26 (such as pins with a rounded tip in this case) within the interface layer 14.

In some embodiments, a discrete fluid actuator 12 and a fluidic latching memory unit 16 are dedicated to each tactile feature 26 for individual control thereof. Importantly, the fluidic memory units 16 function using pressure-encoded binary signals (high and low pressure) that enable individual fluid actuators 12 to be controlled without the need for dedicated external pressure control features.

A few external fluidic control inputs 13 are able to control a plurality of fluid actuators 12 and tactile features 26. For example, a latching fluidic shift register would allow a plurality of fluid actuators 12 to be addressed using a bus driven by a fewer number of fluidic control inputs 13. Similar to how the very-large-scale integration (VLSI) movement enabled mass scaling-down of electronic logic circuits to a single chip, fluidic logic networks enable the large-scale integration of fluidic elements. Specifically, the tactile display could work much like active-matrix LCDs introduced in the 1970s. Basic electronic circuits, repeated for each pixel, are built directly into the display using thin-film transistors. The circuits are X-Y addressable and crucially, are latching, allowing them to store the state of each pixel as the display is updated. Applying this addressing concept to pressure-based tactile displays would allow the number of external pressure control valves required to be reduced from thousands (one for each tactile feature) down to just a few.

Figure 1B:
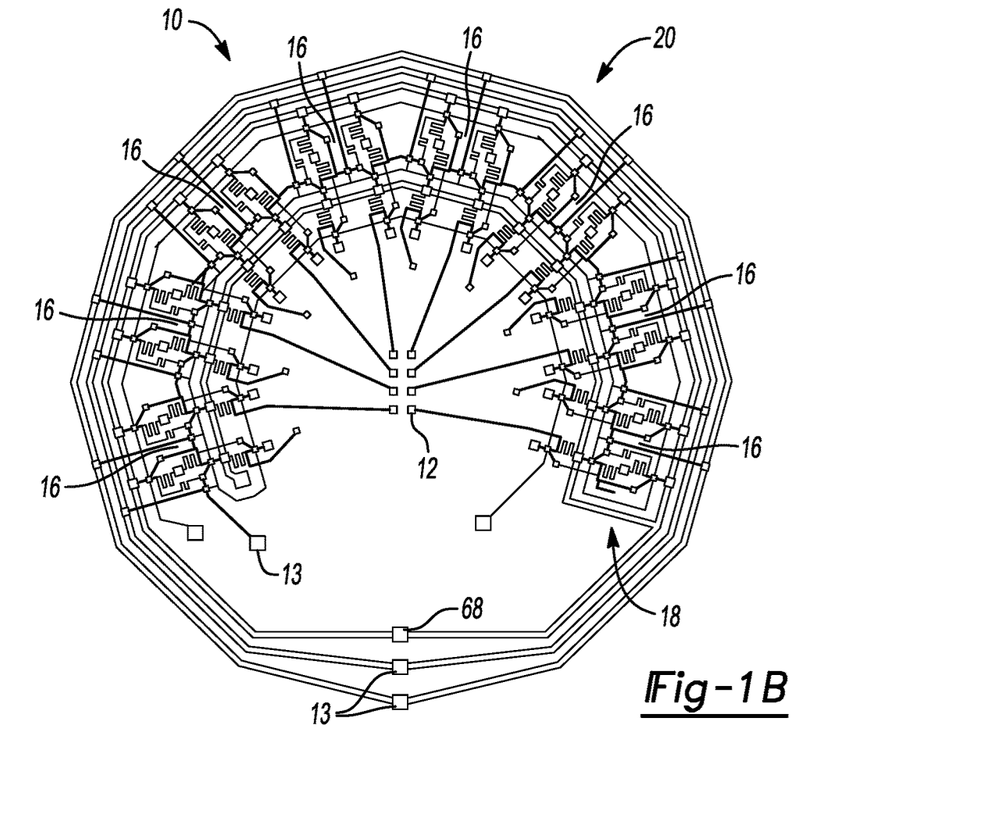
FIG. 1B illustrates a chain of fluidic latching memory units linked to a set of actuator elements according to the principles of the present teachings, where both fluidic logic and actuator elements are combined in a single layered soft material substrate.

Advantageously, both the fluid actuators 12 and fluidic memory units 16 can be integrated into the same substrate 20, and manufacturing of all components can be scaled using standard multilayer micromachining techniques that have been developed for microfluidics technology. For example, FIG. 1B illustrates an embodiment in which a chain of eight fluidic memory units 16 is integrated with a collection of eight fluid actuators 12 in a single substrate 20. The improved method of integrating fluidic logic circuitry layer 18 with fluid actuators 12 presented here increases the scalability of fluid actuators suitable for tactile devices, thereby making the creation of a large-area dense array possible.

To support two or more applications with possibly different requirements for pin density, shape, or configuration, interfacing layers with various design features can optionally be interchanged. For example, the design of one interfacing layer might be optimized to support refreshable braille while another is optimized to support tactile graphics.

Figure 2A:
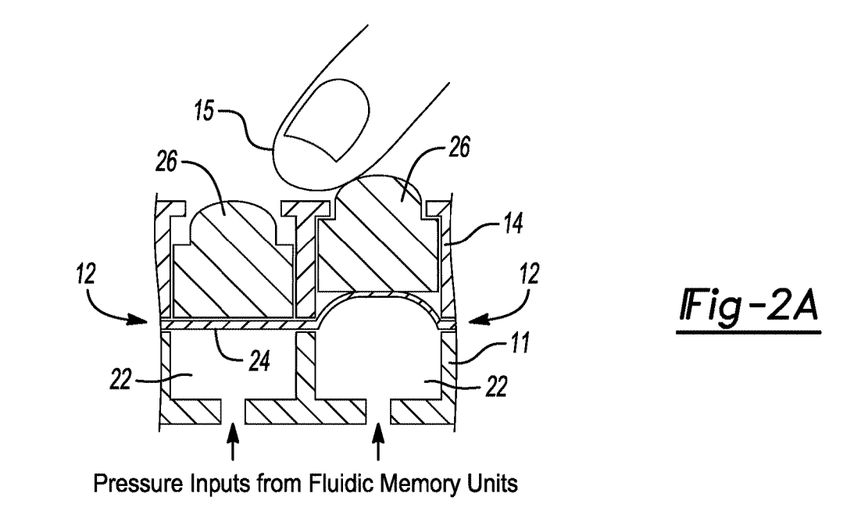
FIG. 2A illustrates a cross-sectional view of an actuator according to the principles of the present teachings.
Figure 2B:
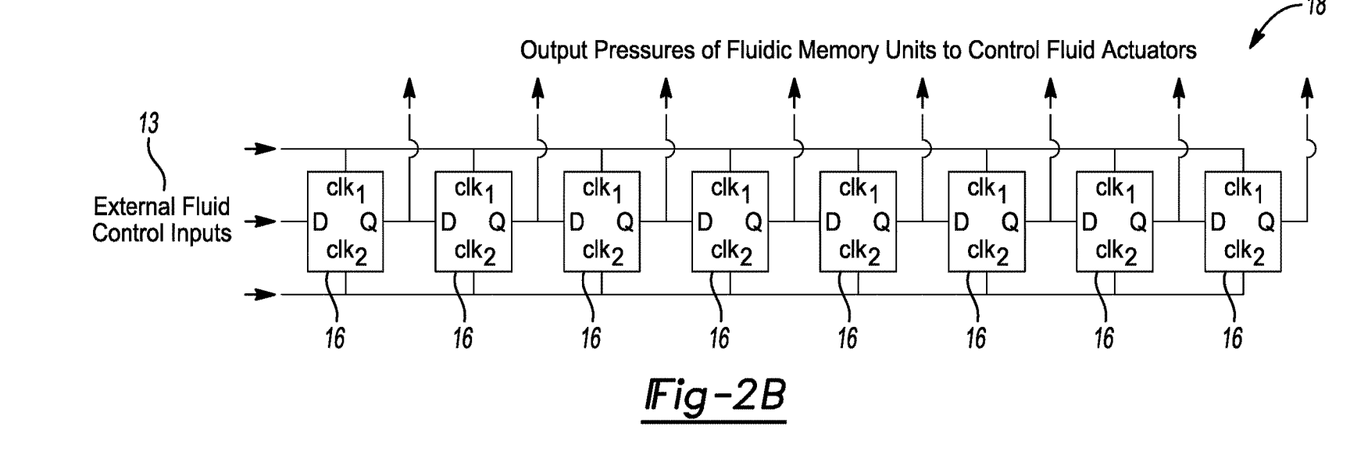
FIG. 2B illustrates a schematic view of a chain of latching memory units that enables addressing of individual actuators according to the principles of the present teachings.
Figure 3A:
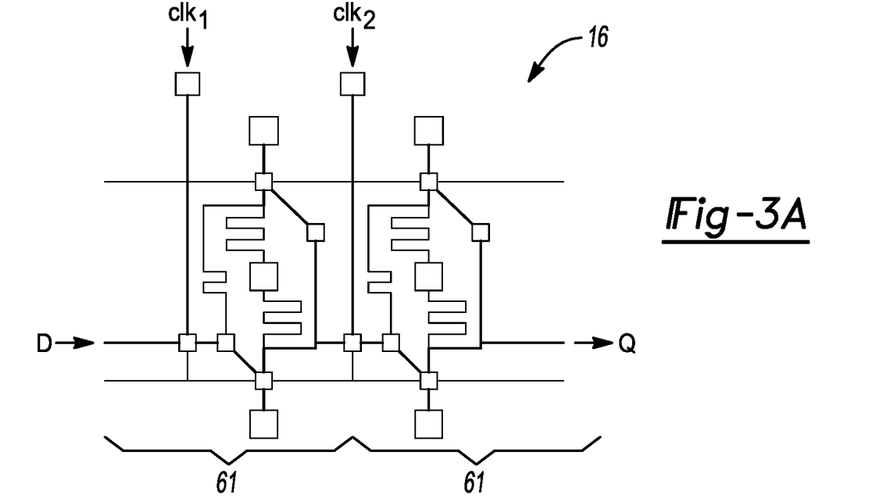
FIG. 3A illustrates a fluidic latching memory unit.
Figure 3B:
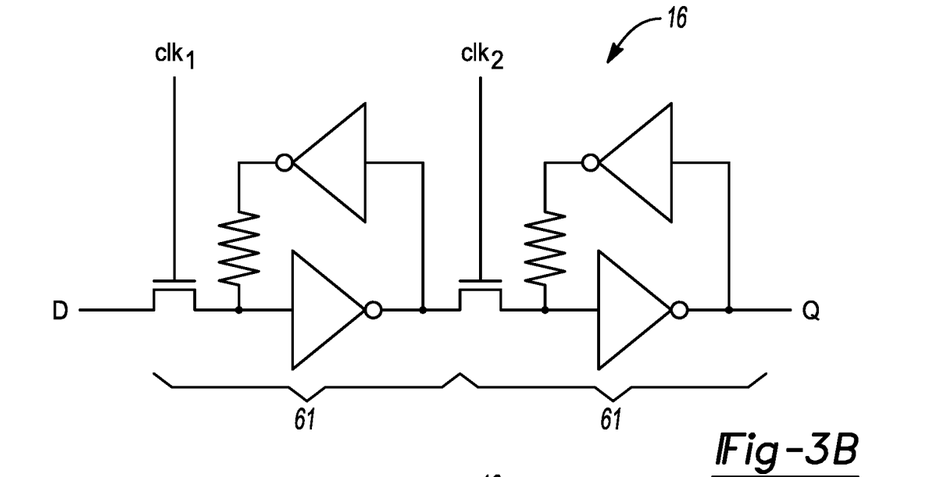
FIG. 3B illustrates the fluidic latching memory unit of FIG. 3A in schematic form.
Figure 3C:
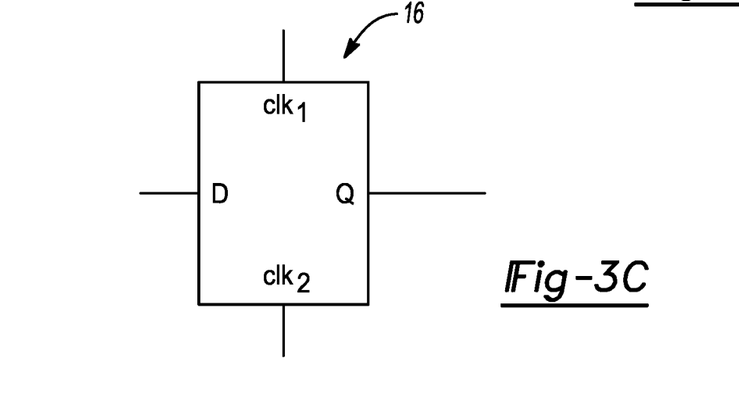
FIG. 3C illustrates the fluidic latching memory unit of FIG. 3A as a single symbol.

In some embodiments, as illustrated in FIG. 2A, the fluid actuator layer 11 and interface layer 14 can be combined into an integral member. Two independent actuator chambers 22 are each divided from atmosphere by a membrane or membranes 24. Positive pressurization of a chamber 22 will displace membrane 24 upwards as shown in the right in FIG. 2A. Upward displacement of a membrane 24 will in turn displace tactile feature 26 in the interface layer 14 upward where such displacement can be felt by a human fingertip 15. Each actuator chamber 11 is addressed by a dedicated fluidic memory unit 16; that is, connected to the output of a dedicated latching memory unit. FIG. 2B shows a chain 19 of eight fluidic memory units 16 (a latching register) whose eight outputs are controlled by only three fluidic control inputs 13. The logical states taken on by the parallel outputs of the chain 19 of fluidic memory units 16 may be set by controlling the logic states of the fluidic control inputs 13 in serial fashion (states encoded sequentially in time and in coordination with certain control inputs designated as clock signals).

Fluid Logic

Fluidic logic systems were first developed in 1959 and researched extensively in the early 1960s. More recently, microfluidic logic systems have been under development for large scale lab-on-a-chip analytic operations that enable parallelization of biological research processes. Some approaches have focused on using droplets or bubbles as Boolean states, but these are not suitable for producing haptic features to be felt by a finger. Others have succeeded in using vacuum-based logic elements, which are not suitable for the proposed pressure-based actuator technologies in their current form. Many pressure-based logic systems have also been created, but most designs fail at producing a logic output sufficient to control subsequent logic elements. In some pressure-based designs, the elements lose their state (on or off) after a period of time. In others, the input and output signal types or levels are different, preventing output of one element from controlling the input of another. Lastly, some pressure-based designs have losses that add up from element to element until the output of an element is not strong enough to drive a subsequent element.

Figure 4A:
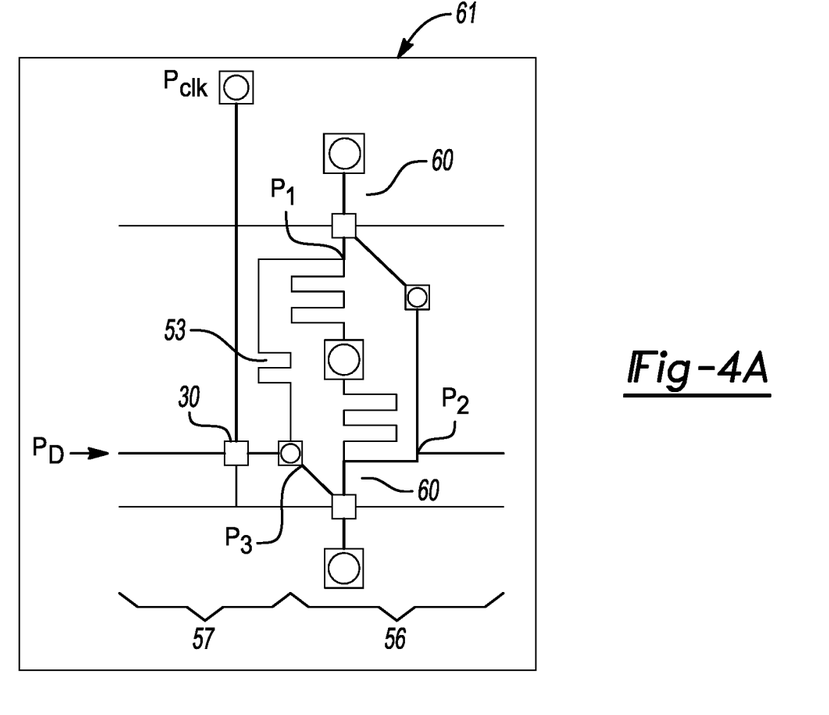
FIG. 4A illustrates a fluidic flip-flop.

A D latch 61 is illustrated in FIG. 4A. The D Latch is a fluidic memory circuit that consists of two parts: a flip-flop 56 and a gated input 57, as illustrated schematically in FIG. 4B. A fluidic flip-flop is a circuit with two NOT gates 60 connected in a feedback loop. Once the output of one NOT gate 60 settles to a certain pressure level, the state of the flip-flop is latched. As such, flip-flops are useful in fluidic logic circuits as basic memory elements. A gated delay latch (D Latch) is created by adding a gated input 57 to a flip-flop 56. The D Latch has two pressure inputs, $P_D$ and $P_{clk}$, and two latching binary outputs, the buffered output, $P_t$ and the inverted output $P_2$. When the gate control pressure $P_{clk}$ is LO (0), the fluidic valve is open and the input signal, defined here as $P_D$, is able to forcibly change the state of the flip-flop. Pressure evolves in the circuit over time until $P_t$ and $P_2$ reach the buffered and inverted logical equivalent of $P_D$, respectively. The added resistance 53 in the flip-flop feedback loop prevents conflict between a new input signal and the previous flip-flop state.

Figure 5A:
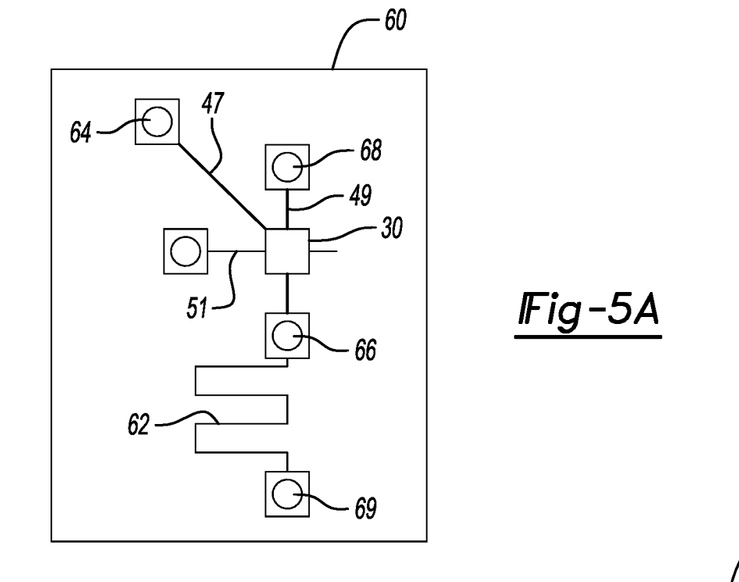
FIG. 5A illustrates a fluidic inverter or NOT gate.
Figure 5B:
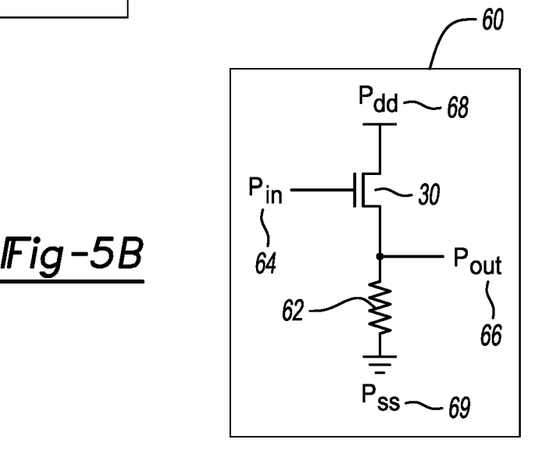
FIG. 5B illustrates the fluidic inverter or NOT gate of FIG. 5A in schematic form.
Figure 5C:
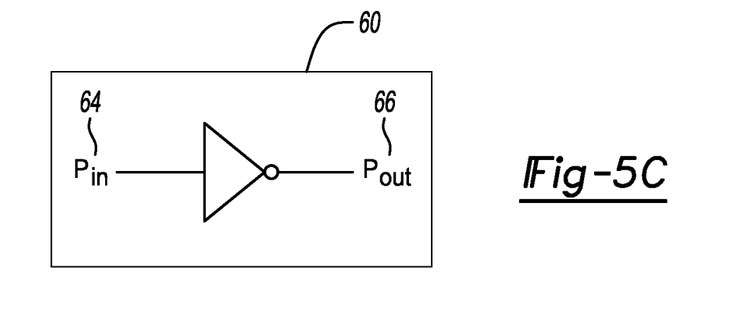
FIG. 5C illustrates the fluidic inverter or NOT gate of FIG. 5A as a single symbol.

A fluidic NOT gate 60 (or inverter) is realized by placing a pressure-controlled flow valve 30 in series with a resistive line 62 (or fluid constriction) between a high 68 and low 69 pressure source, as shown in FIG. 5A. FIG. 5B shows a schematic illustration of the fluidic NOT gate 46. FIG. 5C illustrates the same NOT gate as a single symbol. In this embodiment, the resistive line 63 is made in a flow layer 49. A high source pressure $P_{dd}$ 68 is applied at one side of the valve 30, and a low pressure $P_{ss}$ 69, in this embodiment, atmospheric pressure $P_{atm}$ (0 kPag), is applied at the end of the resistive line 62. The NOT gate produces an output pressure 66 opposite to its input pressure 64. When the valve is closed, corresponding to a logical HI input (see FIG. 6A) at the valve gate 37, there is no fluid flow. The pressure output 66 is connected directly to low pressure $P_{ss}$ via the resistive line 62, so the output pressure $P_{out}$ 66 is equal to the low pressure $P_{ss}$ 69. When the valve is open, corresponding to a logical LO input (see FIG. 6A), fluid flows from $P_{dd}$ to $P_{ss}$, creating a pressure drop across both the valve 30 and the resistive line 62. In an electrical analogy, the circuit acts as a voltage divider. The output pressure $P_{out}$ is calculated as:

$$P_{out}=P_{dd}(R2/(R1+R2)) \quad (Eq. 2)$$

Where R1 and R2 are the fluid resistances of the valve and resistive line, respectively. If the resistance R2 is designed much larger than the valve resistance R1, the pressure drop across the valve is relatively small and the output pressure is only slightly less than the difference between $P_{dd}$ and $P_{ss}$.

Figure 6A:
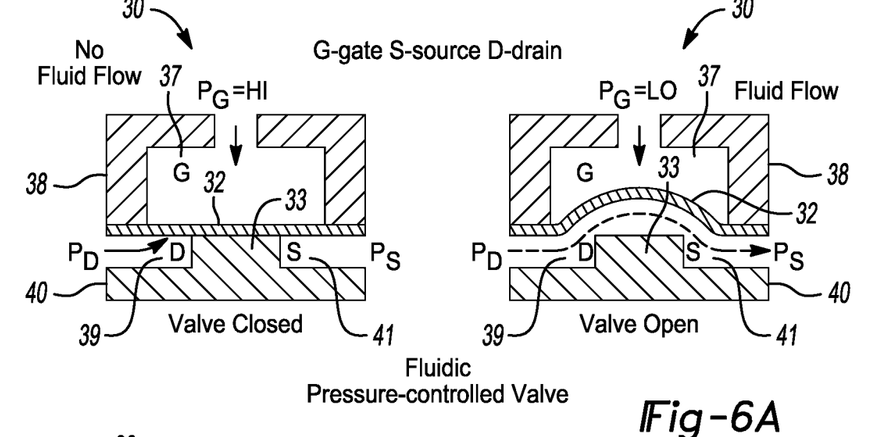
FIG. 6A illustrates a fluidic transistor in two states: CLOSED and OPEN.
Figures 6B, 6C, 6D:
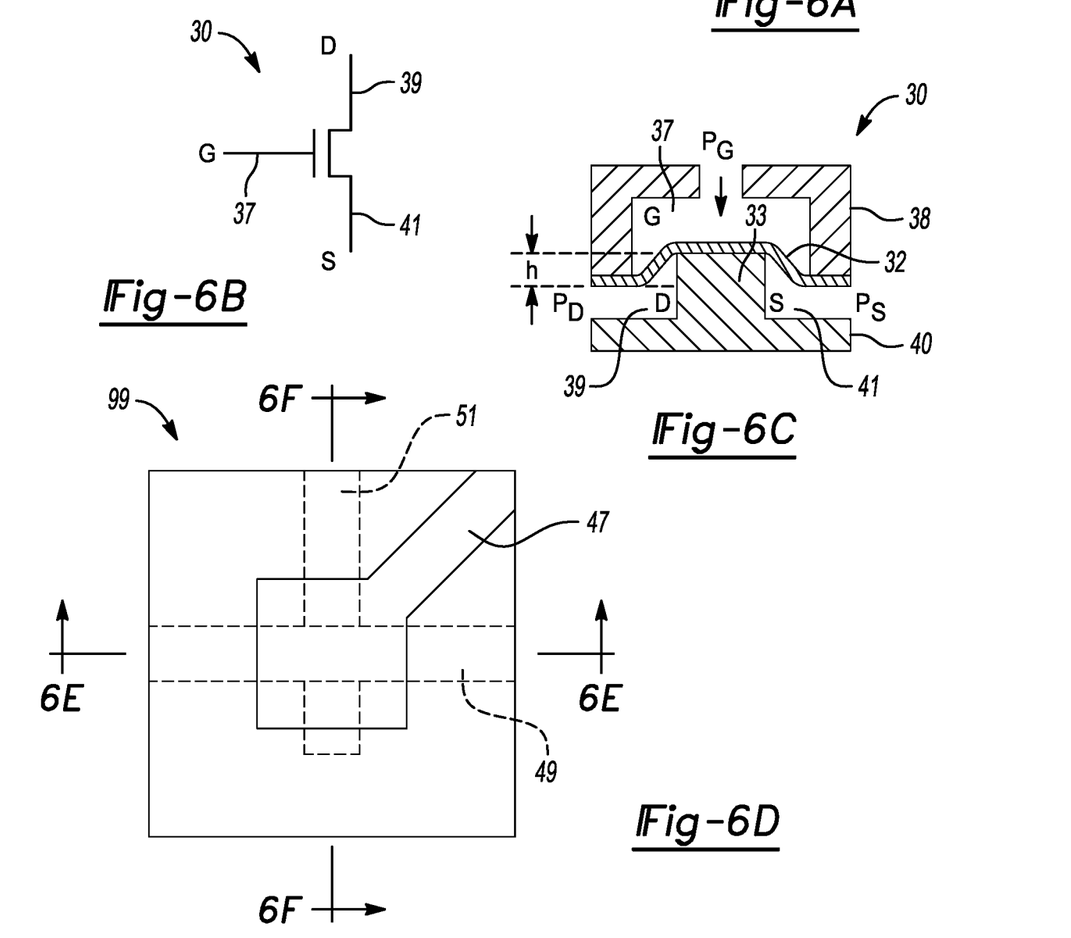
FIG. 6B illustrates the fluidic transistor of FIG. 6A as a single symbol.
FIG. 6C illustrates a fluidic transistor that exhibits pressure-gain by virtue of a pre-stretched membrane.
FIGS. 6D through 6J illustrate various embodiments of the fluidic transistor in various plan and cross-sectional views.

The basic building block for fluidic logic circuitry layer 18 is a pressure-controlled flow valve 30. The operation of the valve 30 is analogous to an electronic transistor, where voltage and current are analogous to pressure and fluid flow. FIG. 6A shows a cross-section of a pressure-controlled normally-open flow valve in the closed and open configurations. In one embodiment, the valve is formed with a flexible control membrane 32 between two layers 38, 40 with channels, as shown in FIG. 6A. This creates two separate layers, which we refer to as the control layer 38 (top) and the flow layer 40 (bottom). The pressure at the valve gate 37 controls the fluid flow between the drain 39 and source 41. The control layer 38 is separated from the flow layer 40 with control membrane 32, so the valve gate 37 does not draw or source any fluid flow. The flow layer 40 is divided by a valve seat 33 that, when in contact with the control membrane 32, separates the drain 39 from the source 41. The fluidic valve 30 operates on binary logic states: HI (1) and LO (0). Any pressure applied at the valve gate 37 that results in a closed valve (control membrane 32 in contact with valve seat 33), preventing fluid flow between drain 39 and source 41, is considered a logical HI. Likewise, any gate pressure that results in an open valve, allowing fluid to flow between drain 39 and source 41 (control membrane 32 not in contact with valve seat 33), is considered a logical LO. FIG. 6B shows an analogous transistor, which is a useful way to represent the flow valve 30 to discuss more complex logic circuits.

Nominally, two different valve states (HI and LO) are possible, producing two threshold gate pressures. When the valve 30 is in an open state, there exists a minimum gate pressure $P_G$ that will close the valve, which we call the valve closing pressure 42. When the gate pressure $P_G$ increases to reach the valve closing pressure $P_{cl}$, the valve 30 closes, stopping fluid flow between drain 39 and source 41. When the valve is in a closed state, there is then a different minimum gate pressure $P_G$ strong enough to keep the valve closed, which is referred to as the valve opening pressure 44. When the gate pressure $P_G$ decreases and drops below the valve opening pressure, the valve opens and fluid flows between drain 39 and source 41. In order to compensate for any losses in fluidic logic elements, it must be possible to control higher pressures between the drain 39 and source 41 with lower pressures at the valve gate 37. To achieve this control, the closing pressure $P_{cl}$ must be less than the pressure at the drain 39 or source 41, which is at most equal to the system-wide high pressure $P_{dd}$. Put mathematically, the valve must exhibit some amount of pressure-gain, defined as:

$$G_p=P_{dd}-P_{cl}>0 \quad (1)$$

To achieve pressure-gain, a valve is constructed such that the valve seat 33 pushes up into the control membrane 32, as seen in FIG. 6C. The valve seat 33 pre-loads the control membrane 32 a distance h. A pressure applied at the valve gate 37 acts in parallel with the force exerted by the deflected control membrane, which enables a gate pressure to close the valve against a larger pressure at the drain 39 or source 41. The deflection of control membrane 32 by the valve seat 33 enables the valve to achieve pressure-gain.

Figure 6E:
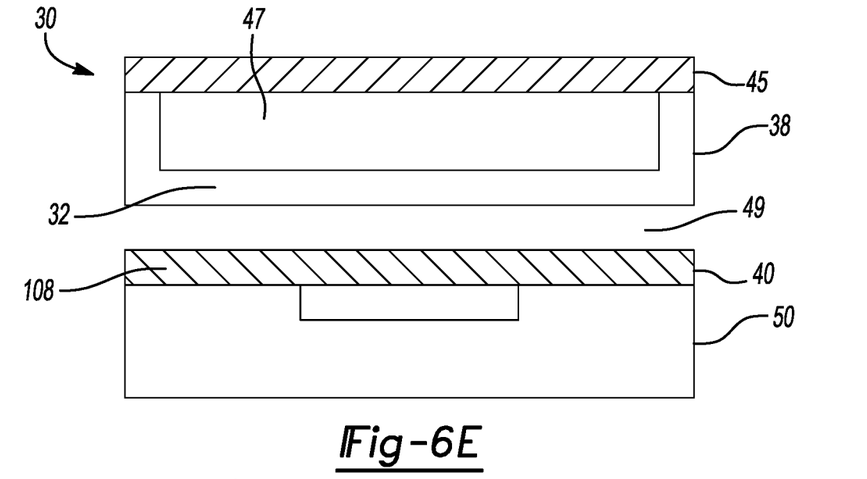
Figure 6F:
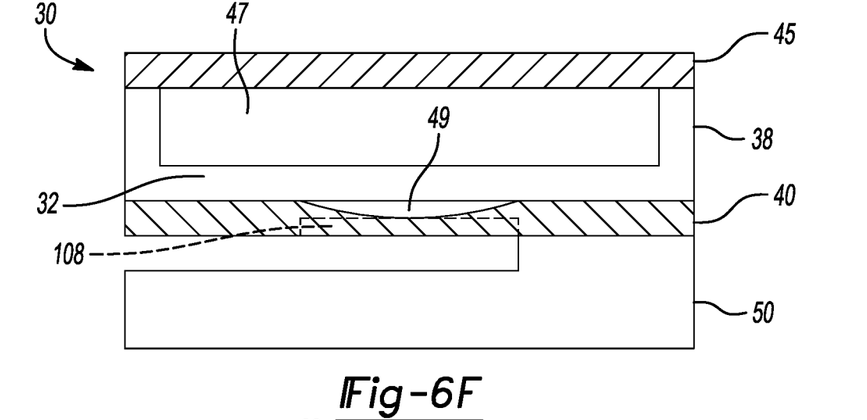

Referring to FIG. 6D, a microfluidic valve is formed in a substrate using flexible materials. The valve is formed at the intersection of a control channel 47 and a flow channel 49 that are separated by a flexible membrane. A gain channel 51 intersects the control 47 and flow 49 channels and is used to create the valve seat that serves to (1) separate the flow channel into a source and a drain and (2) create pressure-gain (described in more detail below). The microfluidic valve is comprised of a gain layer 50, coupled to a flow layer 40, coupled to a control layer 38, coupled to a seal layer 45. FIGS. 6E and 9F show the assembly of the layers in one step of the fabrication process. The control layer is comprised of a control channel 47 and a control membrane 32. The flow layer is comprised of a flow channel 49 and a membrane 108. The flow channel is pictured with a rounded profile, but can be made with other profiles.

Figure 6G:
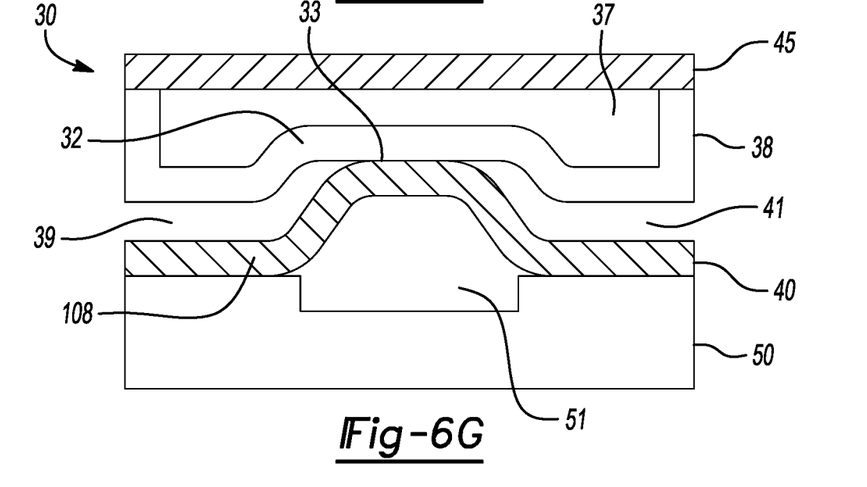
Figure 6H:
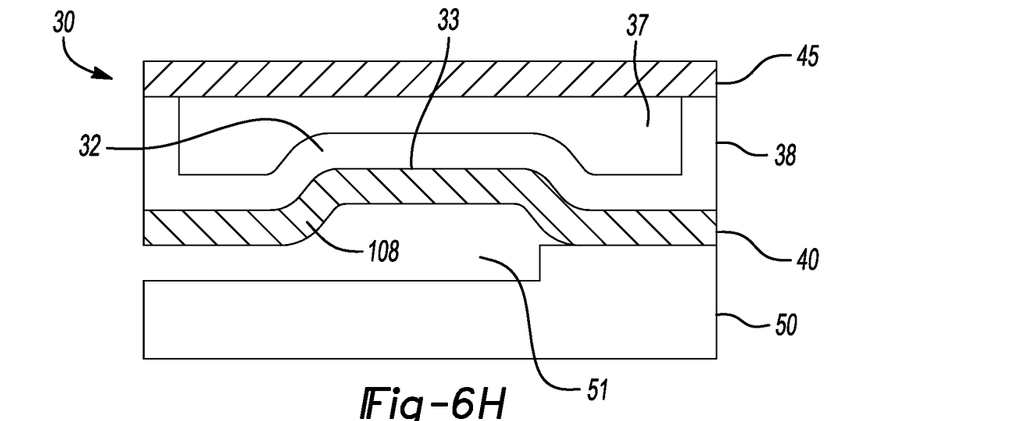
Figure 6I:
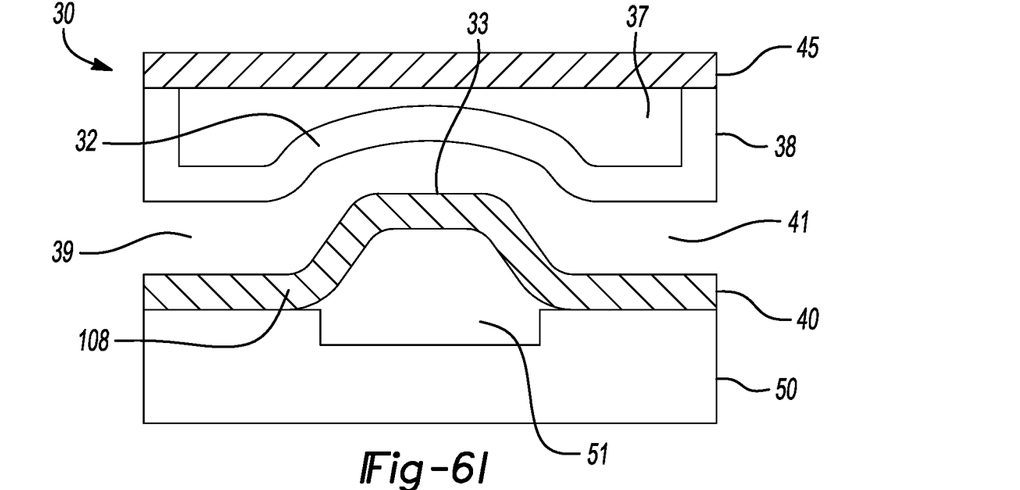
Figure 6J:
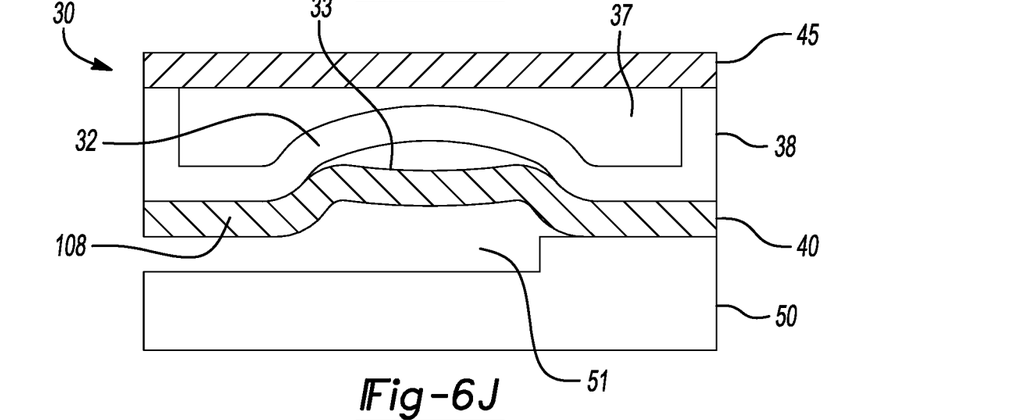

In another step of the fabrication process, the gain channel is pressurized with fluid until the flow channel membrane 108 in the flow layer 48 deflects into the control membrane 32 in the control layer 38 to form a valve seat 110 (see FIG. 6G-J). After this step, the microfluidic valve resembles the basic valve construction in FIG. 2D. FIGS. 6G and 9H show two cross-sectional views of the microfluidic valve in the closed state. FIGS. 6 and 9J show two cross-sectional views of the valve in the open state. The microfluidic valve has a gate 112, a drain 114, a source 116, and a valve seat 110. To achieve pressure-gain in the microfluidic valve, the gain channel 51 is pressurized with fluid at a higher pressure than the source pressure $P_{dd}$ 68 in the flow layer.

Figure 8A:
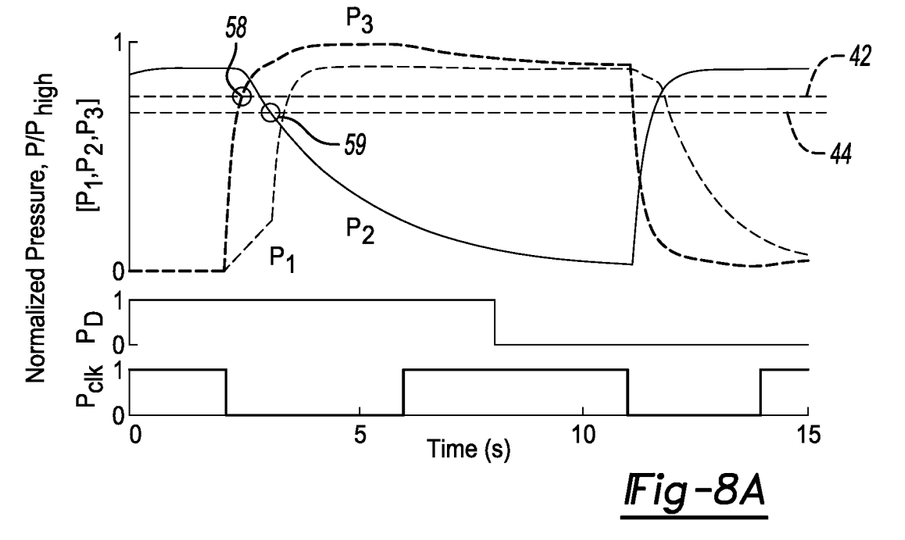
FIG. 8A is a graph illustrating normalized pressure versus time for two pressure control inputs and three response pressures to illustrate the operation of the fluidic transistor.
Figure 8B:
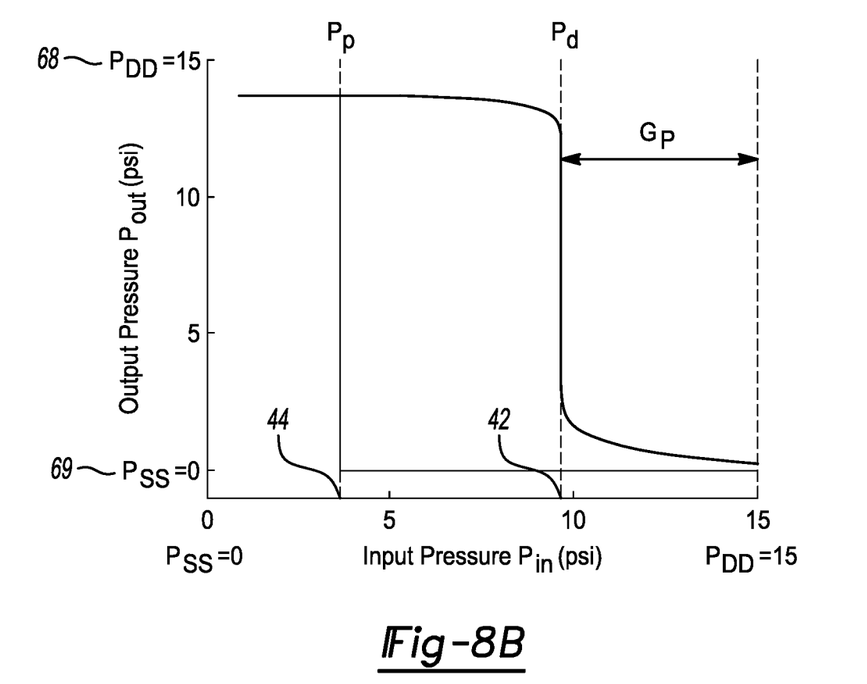
FIG. 8B illustrates measurements of the fluidic transistor output pressure versus input pressure.
Figure 8C:
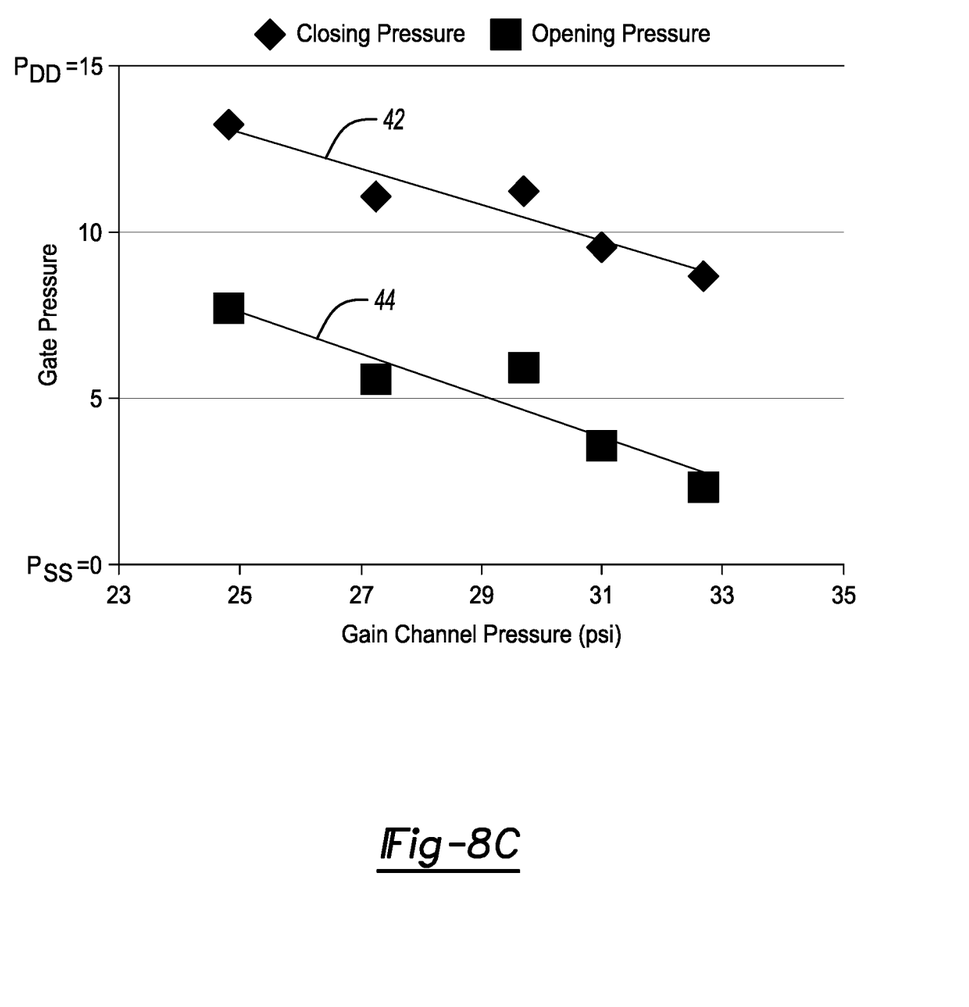
FIG. 8C illustrates measurements of the pressure required to open and the pressure required to close a fluidic transistor.

The effect of the pressure applied to the gain channel on the valve pressure-gain is illustrated in FIG. 8B and FIG. 8C. FIG. 8B shows a trace of the change in output pressure of a fluidic transistor based on the input pressure applied at its gate 37 when there is a pressure of 15 psi applied at the valve drain 39. The results shown in FIG. 8B are for a fluid transistor with an air pressure of 31 psi applied to the gain channel 51. The closing pressure 42 and opening pressure 44 are displayed as dotted lines and are less than the source pressure of 15 psi. The results show that one embodiment of the valve 30 exhibits pressure-gain needed for sequential logic. FIG. 8C shows the opening pressure 44 and closing pressure 42 for microfluidic valves with different amounts of pressure applied to the gain channel 51. All results in FIG. 8C are for a pressure of 15 psi applied at the valve drain 39. The results show a decrease in both the opening pressure 44 and closing pressure 42 for fluidic valves 30 when the pressure applied to the gain channel 51 is increased. All results show valves with positive pressure-gain.

Figure 4B:
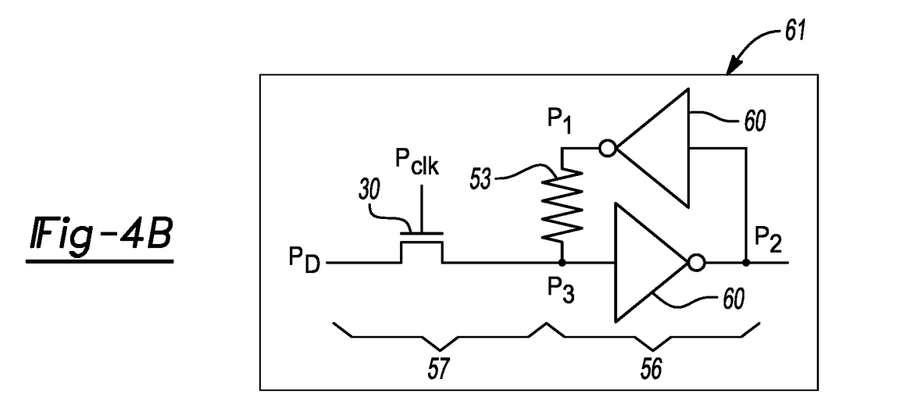
FIG. 4B illustrates the fluidic flip-flop of FIG. 4A in schematic form.

The channels and chambers along with the walls or membranes intervening between the channels and chambers are structured to realize relationships between fluid pressure and flow at any two given locations within the device that are advantageous to the rapid execution of logic and actuator functions. These relationships may be either resistive, inducing pressure drops directly proportional to flow, or capacitive, inducing pressure drops proportional to the integral of flow over time, or inductive, inducing pressure drops proportional to the derivative of flow over time. The relationships may also involve pressure and flow at three or more locations within the device. For example, a pressure controlled flow valve involves pressure at one location determining the flow between two other locations, in analogy to an electrical transistor. The manner in which relationships between pressure and flow are combined, as determined by the interconnection of the channels and chambers, is completely analogous to the manner in which relationships are combined in an electrical circuit of resistors, capacitors, inductors, and transistors. The design of the compliance in the walls and or membranes or the geometry of the channels and chambers along with the mass and compressibility of the fluid that fills the various interconnected channels and chambers all influence the relationships and in turn the rate at which signals are propagated through the device. For example, the combined effect of resistive and capacitive relationships, distributed across the device in a manner that may be either lumped or continuous, is to produce first order dynamics in the propagation of signals encoded as pressure variation over time. That collection of first order dynamic responses must be sufficiently rapid and of sufficient amplitude relative to thresholds established by the design to realize certain logic or actuator functions. Since certain sequential logic functions rely on feedback interconnections, or interconnections that form loops, the time interval over which a signal propagates around a loop must be shorter than the time interval between certain features in input control signals. For example, FIG. 4A shows a pressure-controlled flow valve 30 controlled by a clocking input pressure $P_{clk}$ along with a feedback interconnection 56 of inverting gates 60 and resistor 53. FIG. 4B shows the corresponding schematic circuit layout. If initially the pressure $P_D$ is HI, transistor 30 is closed (pressure $P_{clk}$ is HI), pressures $P_1$ and $P_3$ are LO, and pressure $P_2$ is HI, then $P_3$ will rise with a first order response when transistor 30 is opened ($P_{clk}$ is set LO), which is made to occur at time t=2 seconds in FIG. 8A. Also, pressure $P_1$ rises by virtue of backflow through resistor 53 with a slower dynamic response starting at t=2 seconds. Once the rising pressure $P_3$ crosses the valve closing threshold 42, as indicated by callout number 58 in FIG. 8A, then the state of the inverting gate intervening between $P_3$ and $P_2$ changes and pressure $P_2$ begins to fall with a relatively slow first order dynamic response. Once the falling pressure $P_2$ crosses the valve opening threshold 44 as indicated by callout 59 in FIG. 8A, pressure $P_1$ begins to rise with a faster first order dynamic response and pressure $P_3$ rises to the source pressure 68. After the point in time at which threshold crossing 59 occurs, the feedback interconnection of the two inverting gates 60 and resistor 53 is ready to be latched. So long as the clocking transistor 30 is not closed before the threshold crossing 59, then the latching function of the feedback interconnection will be preserved. After the clocking transistor 30 is closed, which occurs at time t=6 in FIG. 8A, then changes to the input pressure $P_D$ will not be transmitted through the circuit.

Key to the design of pressure-based fluidic logic for actuator control is the ability to cascade any number of embedded fluidic control features without loss of signal or function. Devaraju et al. and Weaver et al. presented pressure-based logic systems in microfluidic applications that achieve cascadability by implementing pressure-gain valves, which are able to control higher pressures with smaller control pressures. Their logic elements rely on a common high-pressure source and achieve output signals that do not diminish along a line of connected control elements.

To realize sequential or combinatorial logic operations, circuit elements must be cascadable; that is, any signal loss must not accumulate along a chain of logic elements. Therefore, the output signal strength must be independent of the input signal and moreover the elements must exhibit a positive pressure-gain. A positive pressure-gain enables a lower gate pressure to close a valve against a larger system high pressure $P_{dd}$.

The output of one NOT gate 55 is the input of the other gate NOT gate 54. When the input $P_3$ to the first gate 55 is a logical LO, the output $P_2$ should be a logical HI. According to Eq. 2, $P_2$ is slightly less than $P_{dd}$, the common high pressure source. Therefore, the input $P_2$ to the second NOT gate 54 is also slightly less than $P_{dd}$. For the second logic gate 54 to function properly, $P_2$ applied at the valve gate must still act as a logical HI, closing the valve against a drain pressure $P_D$ equal to $P_{dd}$. Therefore, the valve must exhibit pressure-gain ($P_{cl}<P_D=P_{dd}$) to function properly. This must be the case for all subsequent valves and so pressure-gain is an essential feature of fluidic valves in sequential logic.

In some embodiments, more than two valve or actuator states are possible, with additional states designated between HI and LO. Thus actuators may be used to drive displacements or produce force at levels between HI and LO. Fluidic transistors and associated circuitry intervening between logic functions and actuator functions can be used to enable differences in pressure or flow states that encode logic signals or logic functions and pressure or flow that drives actuator functions.

Figure 7A:
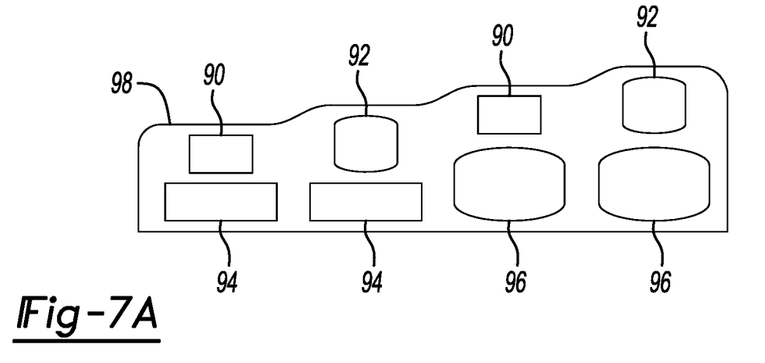
FIG. 7A illustrates a means of producing up to four distinct programmable heights of a raised surface by selectively driving two stacked actuators.

Fluid actuators 12 can be arranged in combinations of potentially different sizes to produce profiles across the device surface that are characterized by multiple controllable levels of displacement in the direction normal to the surface. For example, FIG. 7 shows a large actuator 94 arranged below a small actuator 90. When a certain amount of fluid is displaced into the small actuator 90, it takes on expanded shape 92. When a certain amount of fluid is displaced into the large actuator, it takes on expanded shape 96. The stacked arrangement of the two actuators can then be used to produce up to three upward displacements of the surface 98 relative to a baseline level established when neither actuator is expanded. A relatively stiff substrate below the stacked actuators prevents downward displacements while the compliant surface is displaced upward. Blocking of fluid flow out of the unexpanded actuators prevents their collapse. Thus the stacked arrangement of an expanded small actuator 92 and unexpanded large actuator 94 produced a first upward displacement of the surface 98, while an expanded large actuator 96 and unexpanded small actuator 90 produces a second upward displacement of the surface 98, and an expanded small actuator 92 and an expanded large actuator 96 produce a third upward displacement of the surface 98.

Figure 7B:
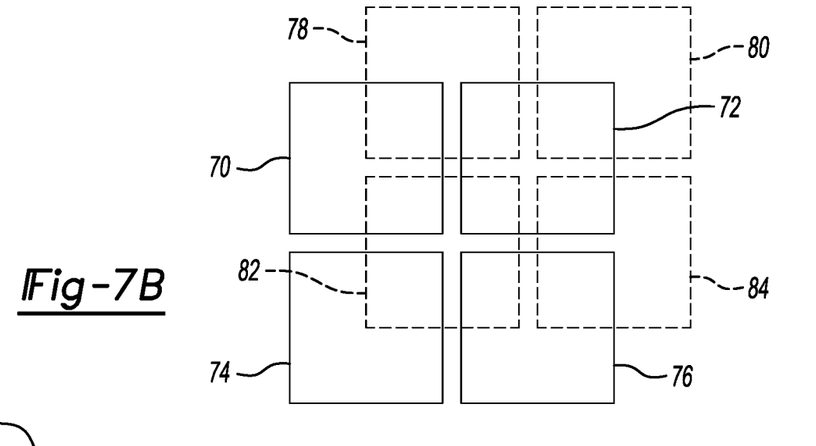
FIG. 7B illustrates a means of producing three distinct heights of a raised surface with programmable shape in the plane of the surface by selectively driving eight actuators stacked in two planes below the surface.
Figure 7C:
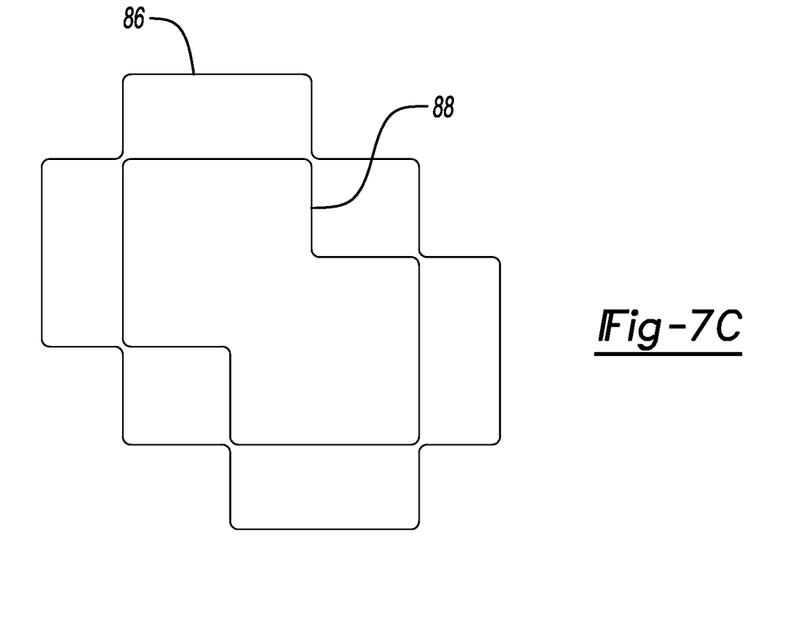
FIG. 7C illustrates the contour produced by movement of actuators in FIG. 7B.

The size, shape, and placement of actuators in directions tangent to the surface can be arranged in various combinations in planes parallel to and below the surface to produce surface profiles with programmable shapes in the directions tangent to the surface. For example, FIG. 7B shows an arrangement of four square shaped actuators 70, 72, 74, and 76 in one plane below the surface and another four square shaped actuators in a second plane below the surface. If actuators 70, 72, and 76 along with actuators 78, 82, and 84 are inflated, then the surface profile depicted in a contour plot in FIG. 7C will be produced. A lower contour 86 and higher contour 88 describe the upward displacement profile of the surface. Alternate actuation combinations will produce alternate surface profiles.

The entire device can be fabricated from a material and filled with certain fluids so that it is optically transparent, and can therefore be overlaid on a touchscreen without impeding the visual display or the finger/stylus position or force sensing functions of the touchscreen device.

The device may incorporate a means to sense the dynamic position of a user's finger and the dynamic pressure imposed by a user's finger. Such sensing may be realized by pressure transducers integrated into the device design.

In the embodiment of the fluidic logic described above, in analogy to PMOS logic in electronics, normally open (NO) fluidic valves are implemented to achieve fluidic logic functions. High pressure acting on the valve gate (FIG. 2A) closes the fluidic valve, and low pressure acting on the valve gate opens the valve. A NO valve is arranged in series with a fluidic resistor to achieve a logical inverter (NOT) gate (FIG. 5A). In some embodiments, in analogy to NMOS logic in electronics, a normally closed (NC) fluidic valve could be implemented to achieve fluidic logic functions. Low pressure acting on the valve gate open the fluidic valve, connecting the drain and source, and low pressure acting on the valve gate closes the valve, separating the drain and source. A NC valve is arranged in series with a fluidic resistor to achieve a logical inverter (NOT) gate. In another embodiment of the invention, in analogy to CMOS logic, NO and NC valves can be implemented together to achieve fluidic logic functions. A NO valve is arranged in series with a NC valve to achieve a logical inverter (NOT) gate. An input signal is applied to the gates of both valves, and an output signal is taken from the drains of the two valves.

NOT gates are used to create more complex fluidic logic circuits. Circuits may include, but are not limited to, NOR gates, XOR gates, NAND gates, flip-flops, buffers, shift registers, multiplexers, etc. The logic circuits are powered by a common pressure or vacuum source and can be cascaded without loss of signal.

Applications

The present device has application in touchscreens including mobile phones and tablets. An array of fluidic actuators can be made thin and optically clear so that it can overlay a visual display. Raised tactile features could be created that are co-located with visual features underneath. The device also has application in refreshable braille displays for the blind, specifically to achieve a multiple-line display capable of rendering braille text and tactile graphics.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fluidic logic and actuator system for outputting a displacement comprising:
    a fluidic logic circuitry layer configured to perform combinatorial and sequential logic functions, the fluidic logic circuitry layer having a fluidic control input and a plurality of fluidic latching memory units each having a flip-flop configured to output a fluid response wherein a state of the fluid response is stored based on the fluidic control input; and
    a fluid actuator layer having a plurality of fluid actuators, each of the plurality of fluid actuators being movable in response to the fluid response of a corresponding one of the plurality of fluidic latching memory units.

2. The fluidic logic and actuator system according to claim 1, further comprising:
    an interface layer having a plurality of movable tactile features each displaceable in response to movement of each of the plurality of fluid actuators.

3. The fluidic logic and actuator system according to claim 2 wherein each of the plurality of tactile features is a tactile pin.

4. The fluidic logic and actuator system according to claim 2 wherein the interface layer is removably mounted to the fluid actuator layer.

5. The fluidic logic and actuator system according to claim 2 wherein the interface layer is integrally formed with the fluid actuator layer.

6. The fluidic logic and actuator system according to claim 1 wherein each of the plurality of fluidic latching memory units is responsive to a pressure-encoded binary signal having a high and low pressure.

7. The fluidic logic and actuator system according to claim 1, further comprising:
a substrate having the fluidic logic circuitry layer and the fluid actuator layer incorporated therein.

8. The fluidic logic and actuator system according to claim 1 wherein the fluidic control input is operably coupled to the plurality of fluidic latching memory units such that the number of the plurality of fluidic latching memory units is greater than the number of the fluidic control input.

9. The fluidic logic and actuator system according to claim 1 wherein at least one of the plurality of fluidic latching memory units comprises a flip-flop being used as a memory element and a gated input.

10. The fluidic logic and actuator system according to claim 1 wherein at least one of the plurality of fluidic latching memory units comprises a fluidic NOT gate.

11. The fluidic logic and actuator system according to claim 10 wherein the fluidic NOT gate comprises a pressure-controlled flow valve in series with a resistive line between a high and low pressure source.

12. The fluidic logic and actuator system according to claim 1 wherein the fluidic logic circuitry layer comprises a pressure-controlled flow valve.

13. A fluidic logic and actuator system for outputting a displacement comprising:
a fluidic logic circuitry layer having a fluidic control input and a plurality of fluidic latching memory units, at least some of the plurality of fluidic latching memory units being configured to perform combinatorial and sequential logic functions and output a fluid response, the fluidic logic circuitry layer having a pressure-controlled flow valve, the pressure-controlled flow valve having:
a first layer having a valve gate;
a second layer having a valve seat; and
a control membrane operably disposed between the first layer and the second layer to form a drain and a source, the member being operably moveable in response to fluid response within the valve gate such that an applied fluid response at the valve gate results in the control membrane contacting the valve seat thereby preventing fluid flow between the drain and the source and reduced fluid response at the valve gate results in the control membrane being spaced apart from the valve seat thereby permitting fluid flow between the drain and the source; and
a fluid actuator layer having a plurality of fluid actuators, each of the plurality of fluid actuators being movable in response to the fluid response of a corresponding one of the plurality of fluidic latching memory units.

14. The fluidic logic and actuator system according to claim 13 wherein the pressure-controlled flow valve defines a pressure-gain configuration when the valve seat is biased against the control membrane.

15. The fluidic logic and actuator system according to claim 1 wherein at least one of the plurality of fluidic latching memory units being configured to exert a corresponding pressure on an adjacent one of the plurality of fluidic latching memory units.

16. The fluidic logic and actuator system according to claim 1 wherein a first of the plurality of fluid actuators is arranged in series with a second of the plurality of fluid actuators such that movement of the first fluid actuator is selectively additive to movement of the second fluid actuator.

* * * * *